United States Patent [19]

Kruse et al.

[11] Patent Number: 5,010,125

[45] Date of Patent: Apr. 23, 1991

[54] ROOM TEMPERATURE PLAIN PAPER INK

[75] Inventors: Jurgen M. Kruse, Clinton; Donald B. Kimball, Jr., Guilford, both of Conn.

[73] Assignee: XAAR Limited, Cambridge, England

[21] Appl. No.: 409,753

[22] Filed: Sep. 20, 1989

Related U.S. Application Data

[63] Continuation-in-part of Ser. No. 379,595, Jul. 14, 1989.

[51] Int. Cl.$^5$ ................................................ C08K 5/15
[52] U.S. Cl. .................................. 524/308; 523/160; 523/161; 260/DIG. 38; 106/30; 524/127; 524/238; 524/376; 524/556; 524/594
[58] Field of Search ............... 524/308, 127, 238, 376, 524/556, 594; 523/160, 161; 260/38, DIG. 38; 106/30

[56] References Cited

U.S. PATENT DOCUMENTS

| | | | |
|---|---|---|---|
| 4,338,133 | 7/1982 | Toyoda et al. | 106/22 |
| 4,361,843 | 11/1982 | Cooke et al. | 346/1.1 |
| 4,386,961 | 6/1983 | Lin | 106/22 |
| 4,390,369 | 6/1983 | Merritt et al. | 106/31 |
| 4,490,177 | 12/1984 | Shioi et al. | 106/23 |
| 4,680,332 | 7/1987 | Hair et al. | 524/377 |
| 4,834,799 | 5/1989 | Song | 106/22 |
| 4,849,773 | 7/1989 | Owatari | 346/140 R |

FOREIGN PATENT DOCUMENTS

| | | |
|---|---|---|
| 62444 | 10/1982 | European Pat. Off. . |
| 99682 | 2/1984 | European Pat. Off. . |
| 176228 | 4/1986 | European Pat. Off. . |
| 181198 | 5/1986 | European Pat. Off. . |
| 187352 | 7/1986 | European Pat. Off. . |
| 206286 | 12/1986 | European Pat. Off. . |

*Primary Examiner*—Joseph L. Schofer
*Assistant Examiner*—John J. Guarriello
*Attorney, Agent, or Firm*—Marshall, O'Toole, Gerstein, Murray & Bicknell

[57] ABSTRACT

An ink jet ink composition useful for printing on plain paper at room temperature comprises a colloidal suspension of a nonaqueous solvent (e.g. selected glycol ethers) and dispersed particles comprising a natural resin or synthetic polymer which is insoluble in water but soluble in the solvent at room temperature, and a dyestuff which is soluble in or bindable to the resin or polymer at room temperature but substantially insoluble in the solvent at room temperature. The ink composition is fluid and has a low viscosity at room temperature.

18 Claims, No Drawings

ROOM TEMPERATURE PLAIN PAPER INK

CROSS-REFERENCE TO RELATED APPLICATION

This is a continuation-in-part of copending, commonly assigned application Ser. No. 07/379,595 filed July 14, 1989.

BACKGROUND OF THE INVENTION

1. Field of the Invention

This invention relates generally to ink compositions and, more particularly, this invention relates to ink compositions useful in jet printing applications with plain paper at room temperature, and methods of ink jet printing on plain paper.

2. Description of Related Art

Printing according to the "ink jet printing" principle, and apparatus for carrying out such printing operations, are well known. In general terms, a fluid ink is forced, under pressure and often at an elevated temperature, through a very small orifice in a printing head.

In so-called "continuous" jet printing operations, ink droplets are passed through a charging area wherein individual droplets receive an electrical charge in response to a signal. The droplets then pass through an electrical field, causing a varied deflection of the individual droplets dependent on the intensity of the charge and field. The droplets are produced continuously, and are directed to the substrate to be printed or, alternatively, to a by-pass gutter.

Due to the nature of the "continuous" jet printing process, inks used therein must be conductive so as to accept a charge. Such inks are generally water-based, as aqueous solutions or dispersions are easily rendered conductive. Water-based inks are generally characterized as having a low viscosity and high volatility. In addition, the interaction of water with paper can cause dimensional changes in the paper. These characteristics can be disadvantageous.

If the viscosity of a jet printing ink is excessively low, misting and the production of stray droplets can result, which in turn result in poor print quality. High volatility of a jet printing ink can result in clogging of jet nozzles due to evaporation. Also, only a few water-based inks are capable of use on plain paper (i.e. a paper not bearing a pigment coating) and are capable of providing a high dye concentration on the surface of the paper so that it is possible to produce fine-sized droplets and to avoid build-up of dyestuff on the substrate surface while providing high color intensity.

So-called "drop on demand" (DOD) systems differ from continuous jet printing systems in that ink droplets are expelled from the nozzle of a printing head only when required during the printing process.

In a DOD printing system, ink is provided from a reservoir via a supply system to a nozzle/actuator system in the printing head. The actuators are generally of the piezoelectric or bubble type, and pressurize ink upon activation to force the ink from a chamber defined by the actuator through a jet nozzle associated therewith.

Since inks used in DOD systems need not be conductive, they have generally been formulated using primarily non-aqueous solvents such as ethylene glycols, particularly diethylene glycols, which are characterized as having low volatility. As such, ethylene glycol and similar solvent-based inks do not evaporate quickly and, thus, exhibit reduced clogging problems.

However, ethylene glycol and other non-aqueous solvents have a relatively high viscosity (which varies significantly with temperature) and thus require relatively more energy for production of droplets.

Solvent-based inks exhibit desirable drying characteristics and are generally biologically stable while water-based inks generally tend to sorb air from the environment and also are susceptible to biological fouling.

In some cases, it may be desirable to use a non-conductive ink (or one having extremely low conductivity) in DOD printers. For example, in DOD actuators wherein piezoelectric electrodes are disposed within an ink-containing chamber, the ink is preferably non-conductive in order to minimize or eliminate electrochemical effects.

Another class of inks used in jet printing are referred to in the art as "hot melt" inks and comprise wax or other thermoplastic materials such that the ink is solid or semisolid at ambient temperatures but fluid at elevated temperatures. The heated ink fluid solidifies when it comes in contact with a paper target.

Such inks generally tend to exhibit excellent dye stability, lightfastness, and no solvent volatility. However, these inks accommodate only relatively low dye concentration and therefore necessitate the production of relatively large drops in order to provide acceptable color intensity. Also, the thermoplastic component of such inks tends to form raised waxy deposits which are easily smeared or scratched off by rubbing.

Hot melt jet inks tend to be viscous and thus require high energy input in order to eject the drop from the printer nozzle. Also, since the entire ink must be rendered fluid by heating, high energy inputs and lengthy time periods are required to reach the printer operating temperature.

SUMMARY OF THE INVENTION

It is an object of the invention to overcome one or more of the problems described above.

According to the invention, a jet printing ink composition is provided which comprises a colloidal suspension in a non-aqueous solvent i.e. a sol, wherein the disperse phase comprises dispersed particles which are water-insoluble but solvated by the solvent at room temperature. This disperse phase comprises a natural resin, synthetic analog thereof, or polymer which is water insoluble but soluble in the solvent at room temperature, and a dyestuff which is soluble in or bound to the resin or polymer but substantially insoluble in the solvent at room temperature. The ink is fluid and has a low viscosity at room temperature. Upon ejection from the printer onto a paper substrate, the disperse phase (which carries the dyestuff) precipitates or gels on the substrate surface as the solvent is absorbed into the substrate and the polymer or resin is rendered insoluble in the solvent by the water and surface size of the paper.

The ink composition of the invention is useful on a wide variety of plain papers, facilitates the production of fine dots without the production of easily smudged raised deposits, facilitates mixing of colors, provides high color intensity, and can be ejected from the printing head actuator at room temperature.

A method of ink jet printing on plain paper using the inventive ink composition is also provided.

Other objects and advantages of the invention will be apparent to those skilled in the art from a review of the following detailed description taken in conjunction with the appended claims.

DETAILED DESCRIPTION OF THE INVENTION

The inventive jet ink composition exhibits many of the advantages of prior solvent-based, water-based, and hot melt jet printing inks while eliminating important disadvantages associated with each of these types of inks. The inventive ink exhibits excellent dye stability, waterfastness, low solvent volatility, and lightfastness associated with prior hot melt inks, yet exhibits desirable drying characteristics and excellent biological stability such as exhibited by prior solvent-based inks.

Similar to many water-based inks, the inventive ink composition is compatible with plain paper (i.e. paper which is free of a pigment coating) and is capable of providing a high dye concentration on the surface of a paper target, with very sharp-edged ink deposits and rapid drying.

The inventive jet ink composition comprises a colloidal suspension (i.e. sol) of dispersed particles in a non-aqueous solvent. The dispersed particles comprise a synthetic polymer or a natural resin (or synthetic analog thereof) which is water-insoluble but soluble in the solvent at room temperature, and a dyestuff which is soluble in or bound by the polymer or resin at room temperature but which is substantially insoluble in the solvent at room temperature. The resulting particles are suspendable, but not soluble, in the solvent at room temperature. The respective proportions of the solvent, resin or polymer, and dyestuff are selected to provide a fluid ink composition at room temperature.

As used herein, the term "colloidal suspension" denotes a system wherein very small solid, semisolid sol particles are substantially uniformly dispersed in a liquid ("solvent") medium. The dispersed particles (which in this case include the resin or polymer and the dyestuff) are typically small enough to pass through a filter membrane having 10 $\mu$m openings.

As such, the resin or polymer is contained in the solvent in a solvated form, but generally comprises multimolecular particles, as opposed to a true solution.

When the ink contacts a paper surface, the dispersed particles settle on the surface with the resin or polymer binding the dyestuff to the cellulose of the paper while the solvent is absorbed into the paper. This maximizes the effective color. Since the dyestuff is insoluble in the solvent, the dyestuff is not absorbed into the paper with the solvent or wicked laterally on the paper.

If necessary to maintain the resin or polymer and dyestuff in stable suspension, an effective amount of a suspending agent may be present in the ink composition.

The Solvent

The solvent is selected to form a low viscosity colloidal suspension with the polymer or resin and dyestuff at room temperature (i.e. about 20°–35° C., generally about 20°–27° C.), and to allow the dispersed particles to precipitate or gel on contact with a water-containing paper substrate surface. The solvent must be rapidly absorbed (i.e. wicked) from this precipitate or gel into the paper substrate. The solvent should have a high boiling point to minimize evaporation and consequent deposition of solids in the jet printing nozzle, which would result in clogging.

The selection of the solvent is made in conjunction with the selection of resin or polymer and dyestuff. As described in detail below, certain natural polysacchride and polyacrylic resins are highly preferred for the dispersed particles.

For use with the preferred resins, useful solvents include generally one or more propylene glycol ethers or ethylene glycol butyl ethers in which the solubility requirements of the resin or polymer and dyestuff as described herein are satisfied.

Such solvents include dipropylene glycol ethers, tripropylene glycol ethers, ethylene glycol butyl ethers, and diethylene glycol butyl ethers. Propylene glycol alkyl ethers such as dipropylene glycol monomethyl ether and tripropylene glycol monomethyl ether are preferred, with tripropylene glycol monomethyl ether being highly preferred. Glycol ethers such as dipropylene glycol monomethyl ether (boiling point 188° C.) and tripropylene glycol monomethyl ether (boiling point 242° C.) perform very well.

Solvents which are suitable for use according to the invention are available commercially from several suppliers, including Dow Chemical U.S.A. of Midland, Mich. under the trade designation "Dowanol." Tripropylene glycol monomethyl ether is designated "Dowanol TPM." Dipropylene glycol monomethyl ether is available under the designation "Dowanol DPM." Ethylene glycol n-butyl ether is sold under the designation "Dowanol EB", and diethylene glycol n-butyl ether is designated "Dowanol DB." Triethylene glycol n-butyl ether is available as "Dowanol TBH."

The Resin or Polymer

For use in the invention, one or more synthetic polymers, natural resins, or synthetic analogs of natural resins which are insoluble in water but soluble in the solvent at room temperature (e.g. 25°–35° C.) are selected. Such polymers or resins are generally alcohol soluble. The resin or polymer preferably will adhere well to the paper substrate, should be optically clear, and should hold the selected dyestuff on the paper surface at ambient conditions.

Preferred polymers or resins are natural resins and synthetic analogs thereof such as alcohol soluble polysacchrides and alcohol soluble polyacrylic resins. A preferred polyacrylic resin is Rohm and Haas Acryloid DM 55 thermoplastic acrylic resin. Suitable natural resins include, without limitation, Gums Kauri, Copal, Mastic, and Sandarac, and useful synthetic resins include Beckacite® fumaric, maleic, and modified phenolic resins from Reichold Chemicals, Inc.

The Dyestuff

The dyestuff (which may include certain pigments such as carbon black) is selected to be soluble in or capable of binding to the polymer or resin at room temperature and above but substantially insoluble in the solvent at room temperature. A wide variety of dyestuffs are useful and many of those characterized as "pigment dyes" in The Colour Index are satisfactory. Since the dyestuff is soluble in the polymer or resin, mixing of hues on the paper surface is facilitated. The dyestuff is preferably of a primary subtractive hue. The dyestuff should be lightfast, and thermally stable even with repeated warming. The dyestuff should be water insoluble once applied to the substrate to prevent smearing upon contact with water containing substances.

Dyes which have been found to be useful include, without limitation, Pigment Green 7, Direct Blue 15, Pigment Yellow 17, Pigment Yellow 30, Pigment Yellow 12, and the Ciba Geigy Microlith Series which includes Black, Red, Blue, Green, and Gold. Pigment Blue 15 is a preferred dyestuff.

Other useful dyes include Paliogen Black, Heliogen Blue, Fanal Blue, Cyan Blue BNF, Imperial Sacandaga Yellow, and Lithol Rubine. These dyes are especially suitable in combination with the preferred TPM solvent.

Additionally, certain carbon blacks are useful as pigments in the invention. Preferred carbon blacks are Continex N234 or N330 carbon black from Witco Chemical Corp. and Regal 660R carbon black from Cabot Corp.

The Suspending Agent

For many dyes (with exceptions, such as Witco Continex N234 carbon black) it is necessary to add a suspending agent to the ink to keep the dispersed particles from settling out of suspension or coagulating, especially when the ink is stored for extended time without agitation. Surfactants, especially non-ionic surfactants with an HLB value of greater than about 13 can be used to prevent the suspended particles from agglomerating and settling. Depending on the dyestuff used, suspending agents such as phosphate esters (Strodex PK 90 or P 100 esters from Dexter Chemical) or fatty acid polyamines such as Kenamine straight chain amines (Humko Chemical) can be used. An example of a useful nonionic surfactant is Igepal CO 720, a nonylphenoxy poly(ethyleneoxy) ethanol from GAF (HLB=14.2).

Proportions of Ingredients and Physical Characteristics of the Composition

According to the invention, the respective proportions of the solvent, polymer or resin, and dye are selected to provide an ink composition which is fluid and preferably has a low viscosity at room temperature.

The ink composition is fluid at room temperature, and the preferred ink compositions (e.g. comprising up to about 12 wt. %, preferably about 4 to about 12 wt. %, polymer or resin in TPM) exhibit Newtonian behavior at ambient conditions.

The preferred ink composition will typically exhibit a low viscosity (i.e. less than about 30 cps, preferably in the range of about 10 to 30 cps) at ambient conditions, and usually be Newtonian in behavior.

Preferably, the viscosity of the ink at room temperature will be in the range of about 15 to 25 cps.

The ink is characterized by high dye absorptivity, resulting in high color intensity, and thus allows the use of relatively low dye concentrations.

Although the respective proportions of dyestuff, polymer or resin, and solvent are widely variable and may be empirically selected by the user depending upon the intended purpose, it is preferred that the resin comprise about 12 wt. % or less of the ink composition, highly preferably in the range of about 4 to 8%, with the total of dye and polymer or resin being about 6 to 14 wt. % or less of the composition.

The weight proportion of resin to dye is preferably low, such as up to about 4:3, preferably up to 3:2 or slightly more. This prevents a build-up of resin on the target surface, allows ready mixing of hues, and provides extremely good color intensity. At the same time, the advantages associated with deposition of the resin and dye on the paper surface are retained.

Preferably, the precipitate or gel deposited on the paper surface after absorption of solvent into the paper will comprise about 25 to 65 wt. % dye.

With reference to the preferred Acryloid DM-55 acrylic resin or Gum Copal resin/TPM solvent system, a preferred composition is 5 to 8 wt. % resin or polymer and a dye to resin ratio (W/W) of up to a maximum of about 3:4, preferably 2:3 or 1:2. Thus, a dye concentration of about 3 to 5 wt. % in the ink composition is highly preferred. Higher resin levels are disadvantageous in that they result in higher viscosities.

The choice of proportions will depend on the viscosity requirements of the ink jet apparatus and the required dye characteristics, as well as the specific resin or polymer used.

It is preferred that the ink be prepared by grinding the dyestuff (e.g. carbon black) and the resin or polymer together in the presence of as small an amount of solvent as possible to disperse the materials and minimize the degree of solvation of the resin or polymer, followed by addition of more solvent to the desired concentration level. The use of this technique facilitates the combining of polymer or resin with the dyestuff and prevents settling of the dyestuff from the ink on standing.

According to the invention, ink jet printing on plain paper may be effected by jetting the jet ink composition against a surface of a cellulosic substrate whereby the solvent in the ink composition is absorbed into the substrate and the resin or polymer and dye in the ink precipitate or gel on the paper surface to form print by contact with water contained in the paper. Calcium or alum in the paper may also promote precipitation.

The cellulosic substrate surface can be plain paper, i.e. paper which is substantially free of a pigment (e.g. silica) coating. Clay or silica fillers are acceptable but not required. Non-pigment coatings such as surface sizing, starch, etc. are acceptable.

The temperature at which the ink is jetted can be relatively low, and is preferably room temperature. However, elevated temperatures up to about 45° C. do not affect the performance of the ink.

The inventive ink is not tacky at room temperature, and adherence to the paper surface is excellent. Since the ink is not tacky, ejection from the nozzle or flow in the actuator are not impeded and energy requirements for printing are minimized.

The foregoing detailed description is given for clearness of understanding only, and no unnecessary limitations should be understood therefrom, as modifications within the scope of the invention will be obvious to those skilled in the art.

We claim:

1. An ink jet ink composition comprising a colloidal suspension of:
   (a) a non-aqueous solvent; and,
   (b) dispersed particles which are suspendable in said solvent at room temperature, said dispersed particles comprising a dyestuff dissolved in or bound to a polymer or resin selected from the group consisting of synthetic polymers and natural resins, said polymer or resin being substantially insoluble in water but soluble in said solvent at room temperature, said dyestuff being soluble in or bindable to said polymer or resin at room temperature but substantially insoluble in said solvent at room temperature, and said polymer or resin being precipitable upon contact with the surface of plain paper, the respective proportions of said solvent, polymer or resin, and dyestuff being selected to provide a fluid ink composition at room temperature.

2. The ink composition of claim 1 further including a suspending agent in an effective amount to maintain said dispersed particles in suspension at room temperature.

3. The ink composition of claim 2 wherein said suspending agent is a nonionic ethoxylated surfactant with an HLB of greater than about 13.

4. The ink composition of claim 3 wherein the concentration of said suspending agent in said ink is no greater than about 0.25 wt. %.

5. The ink composition of claim 4 wherein said suspending agent concentration is about 0.05 to about 0.20 wt. %.

6. The ink composition of claim 3 wherein said suspending agent is selected from the group consisting of polyphosphoric ester acid anhydrides and a fatty acid polyamines.

7. The ink composition of claim 1 wherein said solvent is selected from the group consisting of propylene glycol ethers and ethylene glycol butyl ethers.

8. The ink composition of claim 7 wherein said solvent is selected from the group consisting of dipropylene glycol ethers and tripropylene glycol ethers.

9. The ink composition of claim 8 wherein said solvent is selected from the group consisting of dipropylene glycol monomethyl ether and tripropylene glycol monomethyl ether.

10. The ink composition of claim 1 wherein said polymer or resin is a natural or synthetic polysaccharide or polyacrylic resin.

11. The ink composition of claim 10 wherein said resin is selected from the group consisting of Gum Kauri, Gum Copal, Gum Mastic, Gum Sandarac, thermoplastic acrylic polymers, and fumaric, maleic, and modified phenolic resins.

12. The ink composition of claim 10 wherein said solvent is tripropylene glycol monomethyl ether and the weight ratio of said dyestuff to said resin is about 3:4 or below.

13. The ink composition of claim 10 wherein said polymer or resin comprises about 12 wt.% or less of said composition.

14. The ink composition of claim 13 wherein said polymer or resin comprises about 5 to 8 wt. % of said composition.

15. The ink composition of claim 13 wherein the weight of said polymer or resin and said dyestuff total about 14 wt. % or less of said composition.

16. The ink composition of claim 13 wherein the proportions of said solvent, said polymer or resin, and said dyestuff are selected to provide a composition viscosity of about 30 cps or less at room temperature.

17. The ink composition of claim 1 wherein said dyestuff is carbon black.

18. The ink composition of claim 1 wherein said dyestuff is a pigment dyestuff.

* * * * *